United States Patent [19]

Yaegashi et al.

[11] Patent Number: 4,946,261

[45] Date of Patent: Aug. 7, 1990

[54] RECORDING METHOD AND RECORDING APPARATUS

[75] Inventors: Hisao Yaegashi; Hideaki Mitsutake, both of Yokohama; Kazuo Yoshinaga, Machida; Masashi Miyagawa, Yokohama, all of Japan

[73] Assignee: Canon Kabushiki Kaisha, Tokyo, Japan

[21] Appl. No.: 204,730

[22] Filed: Jun. 10, 1988

[30] Foreign Application Priority Data

Jun. 11, 1987 [JP] Japan ................................ 62-144116
Oct. 6, 1987 [JP] Japan ................................ 62-250568
Jun. 6, 1988 [JP] Japan ................................ 63-137251

[51] Int. Cl.$^5$ .................... G02F 1/01; G03B 77/48; G01D 9/42; G03C 11/00
[52] U.S. Cl. .................................. 350/353; 350/354; 350/355; 350/346; 350/347 V; 350/350 R; 346/107 R; 346/138; 346/151; 355/18; 355/50; 430/21; 430/31
[58] Field of Search ............... 350/353, 354, 355, 346, 350/347 V, 350 R, 347 E; 346/107 R, 138, 151; 307/425; 430/31, 21; 355/18, 50

[56] References Cited

U.S. PATENT DOCUMENTS

| | | |
|---|---|---|
| 3,831,165 | 8/1974 | Chivian et al. .................... 350/353 |
| 3,970,382 | 7/1976 | Fisher et al. ....................... 350/354 |
| 3,984,184 | 10/1976 | Pflugbeil ............................. 355/18 |
| 4,332,872 | 6/1982 | Zingher ............................... 350/353 |
| 4,396,250 | 8/1983 | Wada et al. ......................... 350/352 |
| 4,428,873 | 1/1984 | Murayama et al. ................. 252/583 |
| 4,615,962 | 10/1986 | Garito ................................. 430/20 |
| 4,707,303 | 11/1987 | Buckley et al. .................... 350/353 |
| 4,711,532 | 12/1987 | Choe ................................... 350/354 |
| 4,717,508 | 1/1988 | DeMartino .......................... 252/583 |
| 4,717,757 | 1/1988 | Dubois et al. ...................... 526/246 |
| 4,720,355 | 1/1988 | DeMartino .......................... 350/353 |
| 4,724,463 | 2/1988 | Matsumoto .......................... 355/50 |

FOREIGN PATENT DOCUMENTS 232138 1/1987 European Pat. Off. .

OTHER PUBLICATIONS

Meredith, "Prospect of New Nonlinear Organic Materials", Nonlinear Optics: Materials and Devices, Apr. 1, 1987, pp. 116 and 121.

Singer et al., "Second Harmonic Generation in Poled Polymer Films", Appl. Phys. Lett., 49(5), pp. 248–250.
Garito et al., "Molecular Optics: Nonlinear Optical Properties of Organic and Polymeric Crystals", pp. 1–26 of Nonlinear Optical Properties of Organic and Polymeric Materials, ACS Symposium, 1983.
Meredith et al., "Characterization of Liquid Crystalline Polymers for Electro-Optic Applications", pp. 110–133 of Nonlinear Optical Properties of Organic and Polymeric Materials, ACS Symposium, 1983.
Twics, "Organic Materials for Optical Second Harmonic Generation", pp. 57–80 of Nonlinear Optical Properties of Organic and Polymeric Materials, ACS Symposium, 1983.
Meredith et al., "Design and Characterization of Molecular and Polymeric Nonlinear Optical Materials: Successes and Pitfalls", pp. 27–56 of Nonlinear Optical Properties of Organic and Polymeric Materials, ACS Symposium, 1983.
Macromolecules, 15, 1385–89, 1982, G. R. Meredity et al.: "Optical and Nonlinear Optical Characterization of Molecularly Doped Thermotropic Liquid Crystalline Polymers".
Applied Phys. Lett., 49, p. 248, (1986), K. D. Singer et al.: "Second Harmonic Generation in Poled Polymer Films".

Primary Examiner—Eugene R. LaRoche
Assistant Examiner—Michael B. Shingleton
Attorney, Agent, or Firm—Fitzpatrick, Cella, Harper & Scinto

[57] ABSTRACT

A recording medium comprises a recording layer formed on a substrate. The recording layer comprises a solid solution of a guest compound in a matrix polymer. The guest compound, such as a para-di-substituted benzene derivative, has a substantial second order micrononlinear optical constant $\beta$ but shows substantially no nonlinear optical effect in its crystalline form. The matrix polymer is preferably a polyoxyalkylene. A part of the recording layer is caused to have a nonlinear optical effect when it is supplied with a combination of an external field such as an electric or magnetic field and heating followed by cooling for solidification, and is caused to lose its nonlinear optical effect when it is subjected to heating followed by cooling for solidification in the absence of such an external field.

31 Claims, 2 Drawing Sheets

RECORDING METHOD AND RECORDING APPARATUS

FIELD OF THE INVENTION AND RELATED ART

The present invention relates to a recording method and a recording apparatus using a recording medium capable of rewriting and high-density recording, particularly a recording method and a recording apparatus using a recording medium wherein a nonlinear optical effect is utilized.

As high-density recording systems capable of rewriting, there have been hitherto known, for example, one utilizing a phase transition phenomenon, one utilizing a photo-magnetic phenomenon, and one utilizing alignment or orientation under electric field of a polymer liquid crystal or smectic liquid crystal.

However, a system utilizing a phase transition phenomenon involves a problem with respect to storage stability of the record. A system utilizing a photomagnetic effect requires a complicated and expensive recording apparatus in order to detect the rotation of a minute plane of polarization. Further, an expensive and rare material is used in a recording medium, so that it involves a problem with respect to the cost and stability of supply at the time of mass production.

Further, a system utilizing alignment under electric field of a polymer liquid crystal or smectic liquid crystal requires scattering or birefringence effect for readout, so that the recording medium requires to have a certain thickness at the minimum, thus leaving a problem of insufficient sensitivity and density.

On the other hand, for a system of controlling a nonlinear optical effect by an external field "although not as a memory", there has been known a method of adding a guest compound having a large nonlinear optical constant in host molecules and applying an electric or magnetic field for orientation of the mixture in order to control the crystalline structure.

For example, it was tried to use a polymer liquid crystal as a host and polar molecules as a guest and utilize the orientation under electric field of the polymer liquid crystal to align the polar molecules. As a result, second harmonic generation (abbreviated as "SHG") was observed under application of an electric field (Meredity, G. R., et al; Macromolecules, 15, 1385 (1982)).

Further, as an example of alignment of polar molecules in an amorphous polymer, a polymethyl methacrylate resin with an azo colorant dissolved therein was formed into a film, heated to a temperature above the glass transition point and supplied with a voltage to align the azo colorant molecules, followed further by cooling to fix the resultant structure. As a result, a nonlinear optical constant of $6 \times 10^{-9}$ "esu" was observed (Singer, K. D., Sohn, J. E. and Lalama, S. J.; Appl. Phys., Lett. 49, page 248 (1986)).

It has been also proposed to mix a nonlinear optical-responsive organic compound in a polymer to obtain a polymer nonlinear optical material (U.S. Pat. No. 4,428,873; JP-A (Kokai) No. 57-45519). A non-linear optical material comprising an acrylamide resin as a host polymer and a nonlinear optical-responsive organic compound as a guest has been also proposed (JP-A (Kokai) No. 62-84139). It has been also proposed to cause crystalline growth of a compound having an asymmetric center in a polyoxyalkylene matrix (JP-A 62-246962).

Such a nonlinear optical material is considered to be usable for data recording or display, if a recorded portion and a non-recorded can be formed therein and detected therefrom based on the presence or absence of a nonlinear optical effect.

As for the second order nonlinear optical effect, however, a guest molecule which per se has a large polarization $\beta$ can show no or only a slight SHG activity when blended in a conventional polymer, if it is a centrosymmetric crystal. For this reason, it has been generally necessary to form the polymer blend into a film and orient the film as by application of an electric or magnetic field or by stretching.

Particularly, in the systems proposed heretofore, a good molecular orientation or a large nonlinear susceptibility could not be obtained because the electric field energy is smaller than the thermal energy as described in the above-mentioned report by Singer, K. D. Further, no polymer optical modulation material obtained by addition of a nonlinear optical-responsive organic compound could show a nonlinear susceptibility exceeding that of the nonlinear optical-responsive organic compound alone, so that it has been insufficient to provide a data recording or display medium wherein a recorded portion and a non-recorded portion are discriminated by detecting a difference in nonlinear optical effect.

SUMMARY OF THE INVENTION

In view of the prior art as described above, an object of the present invention is to provide a recording method and apparatus using a recording medium which is composed of a material suitable for mass production and is susceptible of rewritable, high-density and high-sensitivity recording.

A more specific object of the present invention is to provide a recording method and apparatus wherein a difference in nonlinear optical effect of a recorded portion and a non-recorded portion of the recording medium is effectively utilized for data recording and display.

A further object of the present invention is to provide a recording method capable of repetitive recording and erasure.

A still further object of the present invention is to provide a process for preparing a printing original plate of an nonlinear optical material through the above recording method.

According to the present invention, there is provided a recording method which comprises:

providing a recording medium including a substrate and a recording layer formed thereon which comprises a solid solution of a guest compound in a polymer, said guest compound having a substantial second order micro-nonlinear optical constant $\beta$ but showing substantially no nonlinear optical effect in its crystal form; and writing a record in the recording layer based on the presence or absence of the nonlinear optical effect at a prescribed portion of the recording layer.

More specifically a record is written in the recording layer by heating and cooling at least a part of the recording layer and applying an external field to at least a part of the recording layer so that at least a part of the recording layer is cooled to solidify under the application of the external field to form a portion showing a nonlinear optical effect and a part, if any, of the recording layer cooled to solidify in the absence of the external field is caused to form a portion showing substantially no nonlinear optical effect.

According to a more specific aspect of the present invention, there is provided a recording method which comprises writing a record in the above-mentioned recording layer by heating and solidifying at least a part of the recording layer under the application of an external field thereby to provide said at least a part of the recording layer with a nonlinear optical effect, and then heating and solidifying a prescribed part in said at least a part of the recording layer in the absence of an external field to cause said prescribed part to lose the nonlinear optical effect.

According to another specific aspect of the present invention, there is provided a recording method which comprises writing a record in the recording layer by applying an external field to substantially the whole part of the recording layer while selectively heating and then solidifying a prescribed part of the recording layer to provide said prescribed part with a nonlinear optical effect.

In the present invention, the record thus formed in the recording layer may be read out by illuminating the recorded part with laser light and detecting optical second harmonic generation generated therefrom.

According to another aspect of the present invention, there is provided a process for preparing a printing original form which comprises preparing a recording medium in the form of a sheet treated in the above-described recording method; contacting the two recording sheet with a photosensitive material and exposing the photosensitive sheet in contact with the recording sheet to laser light; and developing the exposed photosensitive material.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

The recording medium used in the present invention has a recording layer on a substrate, and the recording layer comprises a solid solution in a matrix polymer of a guest compound which has a substantial second order micro-nonlinear optical constant (molecular nonlinear optical susceptibility) of generally $5 \times 10^{-30}$ e.s.u. or more, preferably $10 \times 10^{-3}$ e.s.u. or more, but shows substantially no nonlinear optical effect in its crystal form. The formation of a solic solution may be confirmed by the absence of a heat-absorption peak or shoulder attributable to the crystal of the guest compound when a sample is subjected to heating at a temperature at a rate of 5–10° C./min by means of a DSC (differential scanning calorimeter).

A most preferred example of the matrix polymer may be polyoxyalkylene.

The polyoxyalkylene used in the present invention comprises oxyalkylene units represents by the formula:

wherein R denotes an alkylene group containing 1–6 carbon atoms (i.e., $C_1$–$C_6$ alkylene group), and n is 2 or more, preferably 10–200,000, representing the total number of the oxyalkylene units in the polyoxyalkylene. The number of the alkylene units in the polyoxyalkylene can vary widely as described above as far as the polyoxyalkylene is provided with a film-formability and contains at least two successive oxyalkylene units.

If the alkylene group R contains more than 6 carbon atoms, the polyoxyalkylene is caused to have a poor mutual solubility with an organic guest compound, thus failing to provide a film with excellent properties. It is especially preferred that the alkylene group R contains 2–4 carbon atoms.

The polyoxyalkylene constituting the matrix of the nonlinear optical material according to the present invention may be a homopolymer consisting of the units represented by the formula (1) alone but can also be a copolymer or a derivative containing the unit of the formula (1) as a partial structure including two or more, preferably 10 or more, successive polyoxyalkylene units in a proportion of 10 mol % or more, preferably 30 mol % or more in the polyoxyalkylene. Such a copolymer may assume various forms as follows.

1. A copolymer containing the unit of the formula (1) in its side chain represented by the following structure:

wherein m is 10 or more, and n1 is 2 or more. The unit $(\text{R}-\text{O})_{n1}$ can be connected to at least a part of the main chain represented by $(\text{A})_m$ and can also form a crosslinking structure. 2. A block polymer containing various forms of the unit (1) in its main chain as represented by the formula:

3. A copolymer assuming a cyclic structure as a combination of 1. and/or 2 as described above.

In the above, the units A, B and C may for example be one selected from the following:

recurring units derived from olefin derivatives, such as:

-continued recurring units derived from diolefin derivatives, such as recurring units derived from diolefin derivatives, such as

(X = halogen)

recurring units derived from ester derivatives, such as recurring units derived from azomethine derivatives such as recurring units derived from imide derivatives amide derivatives, such as

Specific examples of the polyoxyalkylene containing the unit (1) as a partial structure include those represented by the following formulas:

wherein R is a $C_1$–$C_6$ alkylene group, $R_1$ and $R_2$ are each a $C_1$–$C_{20}$ alkyl group, and n1 is 2 to 100,000;

wherein R is a $C_1$–$C_6$ alkylene group, $R_3$ and $R_4$ are each H or a $C_1$–$C_{20}$ alkyl group, and n1 and n2 are each 2 to 10,000;

wherein $R_1$, $R_2$ and $R_3$ are each a $C_1$–$C_6$ alkylene group, and n1, n2 and n3 are each 2 to 100,000;

wherein R is a $C_1$–$C_6$ alkylene group, X is —H, —$CH_3$ or a halogen radical, n1 is 10 to 20,000, and m is 10 to 100,000;

wherein R is a $C_1$–$C_6$ alkylene group, $R_1$ is a $C_1$–$C_{18}$ alkylene, cyclohexylene, phenylene, biphenylene or tolylene group, n1 is 10 to 100,000 and m is 10 to 10,000;

wherein R is a $C_1$–$C_6$ alkylene group, $R_1$ is a $C_1$–$C_{18}$ alkylene, cyclohexylene, phenylene, biphenylene, terphenylene or tolylene group, n1 is 10 to 100,00, and m is 10 to 10,000.

The polyoxyalkylene matrix of the present invention may be composed of the above-described polyoxyalkylene alone but can be a mixture with another material, such as polymers inclusive of poly(methyl methacrylate), poly(vinyl acetate), polystyrene, poly(vinylidene fluoride), poly(vinylidene cyanide-vinyl acetate), poly(vinylidene fluoride-tetraluoroethylene), poly(vinylidene cyanide-vinyl propionate), poly(vinylidene cyanide-vinyl benzoate), poly(vinyl alcohol), polyimide, etc., polymer liquid crystals, liquid crystals, and powder of inorganic compound. In such a case, it is preferred that the polyoxyalkylene constitutes more than 10 wt. %, particularly more than 30 wt. %, of the resultant mixture constituting the matrix.

The guest compound or dopant used in the recording layer generally has at least one of an electron donative group and an electron attractive group. The guest compound may preferably be in the form of aromatic compounds, such as mono-substituted benzene derivative, di-substituted benzene derivative, tri-substituted benzene derivative, tetra-substituted benzene derivative, mono-substituted biphenyl derivative, di-substituted biphenyl derivative, tri-substituted biphenyl derivative, tetra-substituted biphenyl derivative, mono-substituted naphthalene derivative, di-substituted naphthalene derivative, tri-substituted naphthalene derivative, tetra-substituted naphthalene derivative, mono-substituted pyridine derivative, di-substituted pyridine derivative, tri-substituted pyridine derivative, tetra-substituted pyridine derivative, mono-substituted pyrazine derivative, di-substituted pyrazine derivative, tri-substituted pyrazine derivative, tetra-substituted pyrazine derivative, mono-substituted pyrimidine derivative, di-substituted pyrimidine derivative, tri-substituted pyrimidine derivative, tetra-substituted pyrimidine derivative, mono-substituted azulene derivative, di-substituted azulene derivative, tri-substituted azulene derivative, tetra-substituted azulene derivative, mono-substituted pyrrole derivative, di-substituted pyrrole derivative, tri-substituted pyrrole derivative, tetra-substituted pyrrole derivative, mono-substituted thiophene derivative, di-substituted thiophene derivative, tri-substituted thiophene derivative, tetra-substituted thiophene derivative, mono-substituted furan derivative, di-substituted furan derivative, tri-substituted furan derivative, tetra-substituted furan derivative, mono-substituted pyrylium salt derivative, di-substituted pyrylium salt derivative, tri-substituted pyrylium salt derivative, tetra-substituted pyrylium salt derivative, mono-substituted quinoline derivative, di-substituted quinoline derivative, tri-substituted quinoneline derivative, tetra-substituted quinoline derivative, mono-substituted pyridazine derivative, di-substituted pyridazine derivative, tri-substituted pyridazine derivative, tetra-substituted pyridazine derivative, mono-substituted triazine derivative, di-substituted triazine derivative, tri-substituted triazine derivative, mono-substituted tetrazine derivative, di-substituted tetrazine derivative, mono-substituted anthracene derivative, di-substituted anthracene derivative, tri-substituted anthracene derivative, or tetra-substituted anthracene derivative.

Examples of the electron donative group attached to the guest compound as described above may include: amino group, alkyl group (methyl, ethyl, isopropyl, n-propyl, n-butyl, t-butyl, sec-butyl, n-octyl, t-octyl, n-hexyl, cyclohexyl, etc.), alkoxy group (methoxy, ethoxy, propoxy, butoxy, etc.), alkylamino group (N-methylamino, N-ethylamino, N-propylamino, N-butylamino, etc.), hydroxyalkylamino group (N-hydroxymethylamino, N-(2-hydroxyethyl)amino, N-(2-hydroxypropyl)amino, N-(3-hydroxypropyl)amino, N-(4-hydroxybutyl)amino, etc.), dialkylamino group (N,N-dimethylamino, N,N-diethylamino, N,N-dipropylamino, N,N-dibutylamino, N-methyl-N-ethylamino, N-methyl-N-propylamino, etc.), hydroxyalkyl-alkylamino group (N-hydroxymethyl-N-methylamino, N-hydroxymethyl-N-ethylamino, N-hydroxymethyl-N-ethylamino, N-(2-hydroxyethyl)-N-methylamino, N-(2-hydroxyethyl)-N-ethylamino, N-(3-hydroxypropyl)-N-methylamino, N-(2-hydroxypropyl)-N-ethylamino, N-(4-hydroxybutyl)-N-butylamino, etc.), dihydroxyalkylamino group (N,N-dihydroxymethylamino, N,N-di-(2-hydroxyethyl)amino, N,N-di-(2-hydroxypropyl)amino, N,N-di-(3-hydroxypropyl)amino, N-hydroxymethyl-N-(2-hydroxyethyl)amino, etc.), mercapto group and hydroxy group.

On the other hand, examples of the electron attractive group may include: nitro group, cyano group, haloge atom (fluorine, chlorine, bromine), trifluoromethyl group, carboxyl group, carboxy ester group, carbonyl group and sulfonyl group.

Specific examples of the guest compound which may be used in the present invention may include the following:

(1) 3-nitro-4-hydroxy-3-sodiumcarboxy-azobenzene,
(2) 4-chloro-2-phenylquinazoline,
(3) aminoadipic acid,
(4) aminoanthracene,
(5) aminobiphenyl,
(6) 2-amino-5-bromobenzoic acid,
(7) 1-amino-5-bromobenzoic acid,
(8) 1-amino-4-bromonaphthalene,
(9) 2-amino-5-bromopyridine,
(10) amino-chlorobenzenesulfonic acid,
(11) 2-amino-4-chlorobenzoic acid,
(12) 2-amino-5-chlorobenzoic acid,
(13) 3-amino-4-chlorobenzoic acid,
(14) 4-amino-2-chlorobenzoic acid,
(15) 5-amino-2chlorobenzoic acid,
(16) 2-amino-5-chlorobenzonitrile,
(17) 2-amino-5-chlorobenzophenone,
(18) amino-chlorobenzotrifluoride,
(19) 3-amino-6-chloromethyl-2-pyrazinecarbonitrile-4-oxide,
(20) 2-amino-4-chloro-6-methylpyridine,
(21) 1-amino-4-chloronaphthalene,
(22) 2-amino-3-chloro-1,4-naphthoquinone,
(23) 2-amino-4-chloro-5-nitrophenol,
(24) 2-amino-4-chloro-5-nitrotoluene,
(25) 2-amino-4-chloro-4-phenol,
(26) 2-amino-5-chloropurine,
(27) 2-amino-5-chloropyridine,
(28) 3-amino-2-chloropyridine,
(29) 5-amino-2-chloropyridine,
(30) aminochrysene,
(31) 2-amino-p-cresol,
(32) 3-amino-p-cresol,
(33) 4-amino-p-cresol,
(34) 4-amino-m-cresol,
(35) 6-amino-m-cresol,
(36) 3-aminocrotononitrile,
(37) 6-amino-3-cyano-2,4-dimethylpyridine,
(38) 5-amino-6-cyano-2-pyrazinyl acetate,
(39) 4-[N-(2-methyl-3-cyano-5-pyrazinylmethyl)amino]-benzoic acid,
(40) 3,5-dinitroaniline,
(41) 4-(2,4-dinitroanilino)phenol,
(42) 2,4-dinitroanisol,
(43) 2,4-dinitrobenzaldehyde, (44) 2,6-dinitrobenzaldehyde,
(45) 3,5-dinitrobenzamide,
(46) 1,2-dinitrobenzene,
(47) 1,3-dinitrobenzene,
(48) 3,4-dinitrobenzoic acid,
(49) 3,5-dinitrobenzoic acid,
(50) 3,5-dinitrobenzonitrile,
(51) 2,6-dinitro-p-cresol,
(52) 4,6-dinitro-o-cresol,
(53) 2,4-dinitrodiphenylamine,
(54) dinitrodurene,
(55) 2,4-dinitro-N-ethylaniline,
(56) 2,7-dinitrofluorenone,
(57) 2,4-dinitrofluorobenzene,
(58) 1,3-dinitronaphthalene,
(59) 1,5-dinitronaphthalene,
(60) 1,8-dinitronaphthalene,
(61) 2,4-dinitrophenol,
(62) 2,5-dinitrophenol,
(63) 2,4-dinitrophenylhydrazine,
(64) 3,5-dinitrosalicylic acid,
(65) 2,3-dinitrotoluene,
(66) 2,4-dinitrotoluene,
(67) 2,6-dinitrotoluene,
(68) 3,4-dinitrotoluene,
(69) 9-nitroanthracene,
(70) 4-nitroanthranilic acid,
(71) 2-amino-5-trifluoromethyl-1,3,4-thiazole,
(72) 7-amino-4-(trifluoromethyl)-coumarine,
(73) 9-cyanoanthracene,
(74) 3-cyano-4,6-dimethyl-2-hydroxypyridine,
(75) 5-cyanoindole,
(76) 2-cyano-6-methoxybenzothiazole,
(77) 9-cyanophenanthrene,
(78) cyanuric chloride,
(79) 1,2-diaminoanthraquinone,
(80) 3,4-diaminobenzoic acid,
(81) 3,5-diaminobenzoic acid,
(82) 3,4-diaminobenzophenone,
(83) 2,4-diamino-6-(hydroxymethyl)pteridine,
(84) 2,6-diamino-4-nitrotoluene,
(85) 2,3-dicyanohydroquinone,
(86) 2,6-dinitroaniline,
(87) 2-amino-5-iodobenzoic acid,
(88) aminomethoxybenzoic acid,
(89) 2-amino-4-methoxybenzothiazole,
(90) 2-amino-6-methoxybenzothiazole,
(91) 5-amino-2-metoxyphenol,
(92) 5-amino-2-methoxypyridine,
(93) 2-amino-3-methylbenzoic acid,
(94) 2-amino-5-methylbenzoic acid,
(95) 2-amino-6-methylbenzoic acid,
(96) 3-amino-4-methylbenzoic acid,
(97) 4-amino-3-methylbenzoic acid,
(98) 2-amino-4-methylbenzophenone,
(99) 7-amino-4-methylcoumarin,
(100) 3-amino-5-methylisoxazole,
(101) 7-amino-4-methyl-1,8-naphthylidene-2-ol.

A preferred class of the guest compounds are those of a para-di-substituted benzene structure, particularly those represented by the formula (2) below:

(2)

wherein D denotes an electron donative group and E denotes an electron attractive group, respectively as described above. Examples thereof may include the following:
(111) 4-aminoacetophenone,
(112) 4-aminobenzoic acid,
(113) 4-amino-α,α,α-trifluorotoluene,
(114) 4-amino-benzonitrile,
(115) 4-aminocinnamic acid,
(116) 4-aminophenol,
(117) 4-bromotoluene,
(118) 4-bromoaniline,
(119) 4-bromoanisole,
(120) 4-bromobenzaldehyde,
(121) 4-bromobenzonitrile,
(122) 4-chlorotoluene,
(123) 4-chloroaniline,
(124) 4-chloroanisole,
(125) 4-chlorobenzaldehyde,
(126) 4-chlorobenzonitrile,
(127) 4-chanobenzaldehyde,
(128) α-cyano-4-hydroxycinnamic acid,
(129) 4-cyanophenol,
(130) 4-cyanopyridine-N-oxide,
(131) 4-fluorotoluene,
(132) 4-fluoroaniline,
(133) 4-fluoroanisole,
(134) 4-fluorobenzaldehyde,
(135) 4-fluorobenzonitrile,
(136) 4-nitroaniline,
(137) 4-nitrobenzamide,
(138) 4-nitrobenzoic acid,
(139) 4-nitrobenzyl alcohol,
(140) 4-nitrocinnamaldehyde,
(141) 4-nitrocinnamic acid,
(142) 4-nitrophenol,
(143) 4-nitrophenetole,
(144) 4-nitrophenyl acetate,
(145) 4-nitrophenylhydrazine,
(146) 4-nitrophenyl isocyanate
(147) 4-nitrotoluene
(148) 4-nitro-α,α,α-trifluorotoluene.

The para-di-substituted benzene derivative represented by the formula (2) has a large intramolecular dipole moment because it has an electron donative group and an electron attractive group at its para positions. On the other hand, the second order micro-non-linear optical constant or polarization β of a molecule is represented by the following formula:

$$\beta = -\frac{e^3}{2h^2}(ri_{(gn)})^2 \, \Delta ri_{(n)} \frac{\omega^2_{(ng)}}{(\omega^2_{(ng)} - \omega^2)(\omega^2_{(ng)} - 4\omega^2)}$$

wherein $\omega_{(ng)}$ denotes an energy difference between the ground and excited state; h, the Planch's constant, $ri_{(gn)}$, a dipole matrix element between the ground and excited states; e, a unit electron charge; and $\Delta ri_{(n)} = ri_{(nn)} - ri_{(gg)}$ (Ward, J. F.; Review of Modern Physics, Vol. 37, page 1 (1965)). As is understood from the above equation, a benzene derivative having polar substituents at its para-positions and having a large dipole moment provides a large second-order nonlinear constant β. However, a compound having a large dipole moment, such as a para-di-substituted benzene derivative, is liable to have an inversion symmetrical center and does not cause SHG in most cases.

According to our study, however, it has been found possible to form a region showing a very excellent nonlinear optical effect by using a recording material comprising a solid solution of a compound having a large second order micro-nonlinear optical constant $\beta$ represented by a para-di-substituted benzene in a matrix polymer represented by polyoxyalkylene, and by heating the material to a temperature sufficient to allow molecular movement of the guest compound, particularly a temperature above the melting temperature of the recording material, and simultaneously applying thereto an external field such as an electric field or magnetic field, followed by cooling for solidification of the recording material.

The recording material constituting the recording layer in the form of a solid solution, when cooled from its molten state to solidifying, forms a region showing nonlinear optical effect because of a uniform alignment of molecules in the solidified portion, if the solidification proceeds under the application of an external field. On the other hand, if the solidification proceeds in the absence of an electric field, the material forms a region showing substantially no nonlinear optical effect because of disorder in molecular alignment.

In the recording system of the present invention, at least a part of the recording medium, more specifically the recording layer, where data is to be recorded, is heated and cooled to solidify while at least a part of the recording layer is placed under the action of an external field, so that a part of the recording layer where data is (to be) recorded (hereinafter referred to as "recording part" or "record part" depending on whether it is before or after the recording) is cooled to solidify under the action of the external field, whereby the molecules and therefor the dipole moments thereof in the recorded part (or portion) are uniformly aligned to generate a nonlinear optical effect, thus effecting data writing. The heating means may be heat-mode laser, a thermal head as used in the field of thermal recording, etc. On the other hand, the external field may be an electric field or magnetic field.

As described above, the part of the recording layer solidified under the external field (referred to as "record part" for convenience) shows a nonlinear optical effect, while the part of the recording layer solidified under no external field (referred to as "non-record part" for convenience) shows substantially no nonlinear optical effect. Accordingly, the recorded data may be read out by illuminating these parts with light (preferably, laser light) with a specific length (e.g., 700–1300 nm) to detect SHG as a nonlinear optical effect from the record part. Further, whole area easure of the record may be effected by heating the whole recording layer to or above the melting temperature, followed by cooling for solidification, in the absence of an external field or alternatively under application of a high-frequency alternating external field. Local or partial erasure of the record may be effected by heating only the record part to be erased to or above the melting temperature, followed by cooling for solidification, in the absence of an external field.

By appropriately combining the above writing and erasure steps, repetitive writing and erasure becomes possible.

The nonlinear optical effect of the recording material constituting the recording layer in the form of a solid solution used in the present invention can be controlled by an external field. Further, it is possible to record an analog or digital data at each recording pit by controlling an external field, so that a high-density recording becomes possible.

The recording medium of the present invention can also be used for a display using a nonlinear optical effect. In this instance, gradational display is possible to provide a highly fine full color display.

In the recording layer of the recording medium of the present invention, the guest compound may be contained in a proportion of generally 1–70 wt. %, preferably 10–50 wt. %, and the matrix polymer represented by polyoxyalkylene may be contained in a proportion of generally 30–99 wt. %, preferably 50–90 wt.%.

The recording layer may preferably be disposed in a thickness of 0.1–20 $\mu$m on a substrate such as a sheet of glass or plastic such as polycarbonate.

Hereinbelow, some embodiments of the recording system of the present invention using such a recording medium will be explained with reference to the drawings.

Figure 1A:
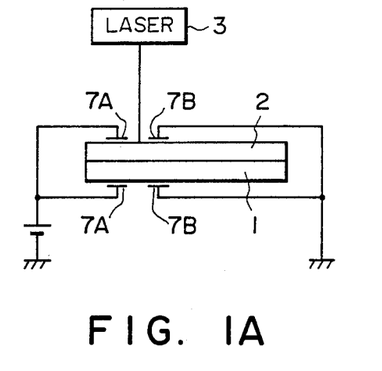
FIGS. 1A, 2A and 3A are schematic views each illustrating a recording system according to the present invention used for writing.
Figure 1B:
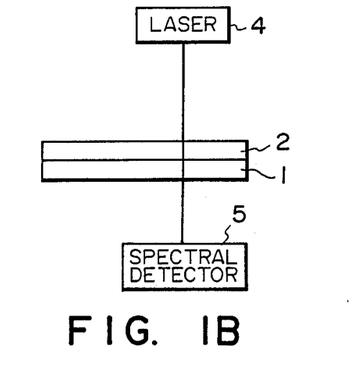
FIGS. 1B, 2B and 3B are schematic views each illustrating a recording system according to the present invention used for readout.

Binary signals of 1 and 0 will be considered as signals to be recorded. FIGS. 1A and 1B are schematic views illustrating a writing mode and a readout mode, respectively, of a recording system according to the present invention. Referring to FIG. 1A, a recording medium comprising a recording layer 2 on a disk-shaped transparent substrate 1 is disposed as shown. A part of the recording layer 2 where a signal of "1" is to be recorded, is irradiated by a writing laser 3 while supplied with an external electric field between electrodes 7A and 7B disposed to face the recording layer in parallel with each other, whereby the part of the recording layer is melted and solidified to cause alignment of the molecules to effect recording. On the other hand, a part of the recording layer 2 where a signal of "0" is to be recorded, is irradiated by the writing laser 3 in the absence of an electric field from the electrodes 7A and 7B, or no laser irradiation is effected if the part is already in a signal "0" state.

The external electric field can be replaced by a magnetic field and the heating can be effected by a thermal head instead of the laser heating.

Then, referring to FIG. 1B, when the recording layer 2 is irradiated by a readout laser 4, a second harmonic of the incident light is generated from the "1" signal recorded part as a nonlinear optical effect and is detected by a spectral detector 5 to read out the "1" signal. At the non-record parts or "0" signal-recorded part, the molecules in the recording layer are not aligned so that substantially no second harmonic of the incident light is generated, whereby the "0" signal is read out.

Figure 2A:
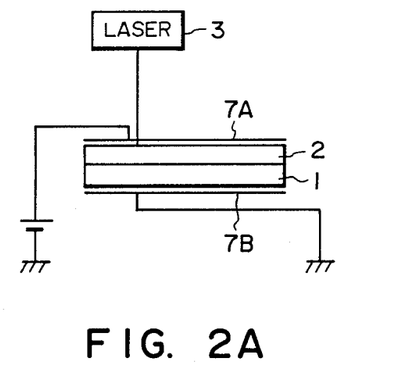
Figure 2B:
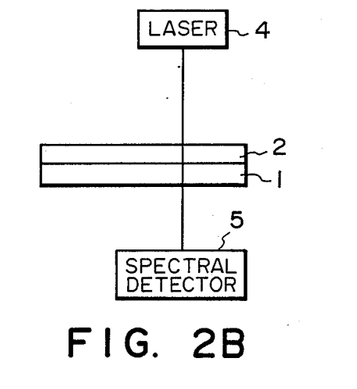
Figure 3A:
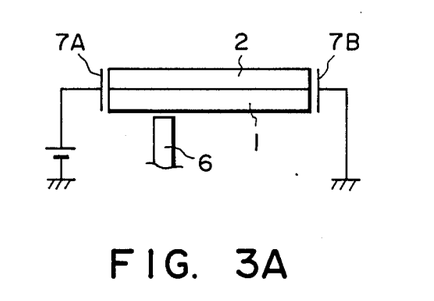
Figure 3B:
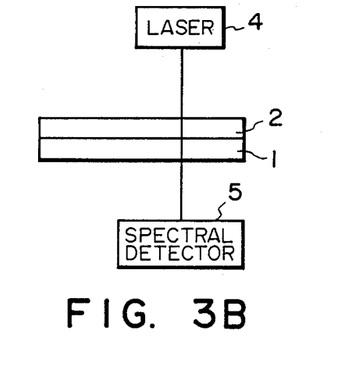
Figure 4:
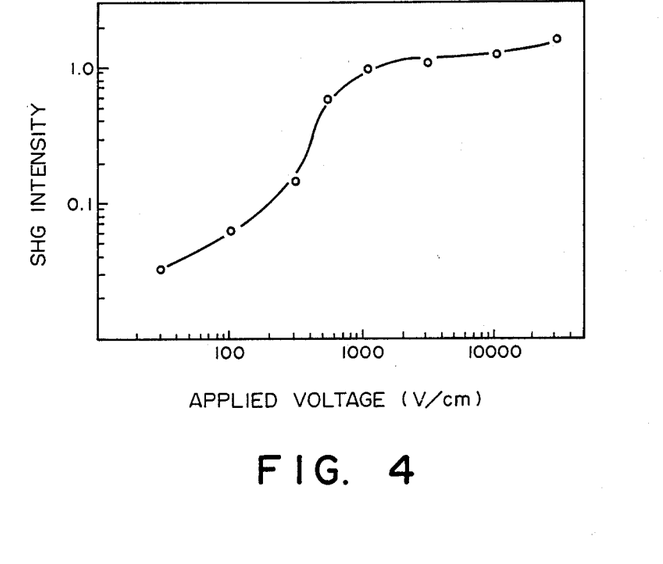
FIG. 4 is a graph showing the dependence of a nonlinear optical effect of a nonlinear optical material on applied voltage.

The direction of the external field may be horizontal as shown in FIG. 1A or vertical as shown in FIG. 2A wherein an electric field is given between a transparent electrode 7A and a back electrode 7B. FIG. 3A shows a writing system where a thermal head is used as a heating means for writing. The readout mode shown in FIGS. 2B and 3B are similar to that explained with reference to FIG. 1B.

In the above embodiments, the recording medium in the shape of a disk is used and a recording position is determined by moving the recording medium preferentially. It is possible to form a recording medium in the form of a card and move the recording means such as laser beam preferentially. Further, in the above embodiments, the writing and readout have been explained so that they are conducted in separate positions but they can be effected at the same position. Further, by using a reflecting substrate, it is possible to use reflected light for readout.

The SHG intensity is proportional to the square of the power density of an incident fundamental wave as shown in the following formula. As a result, by using the SHG intensity as a focusing signal, sharp focusing can be effected by a very single detecting system required of detecting only a light quantity.

$$P^{2\omega} = 2\left(\frac{\mu_0}{\epsilon_0}\right)^{3/2} \left(\frac{\omega^3 d^2 l^2}{n^3}\right) \frac{\sin^2(\Delta k l/2)}{(\Delta k l/2)^2} \frac{(P^\omega)^2}{A}$$

wherein $\Delta k = k^{2\omega} - 2k^\omega$ (difference in light transmission speed), $P^\omega/A$ = power density, d: nonlinear optical constant, l: length of optical path, $\epsilon_0$: dielectric constant of vacuum, $\mu_0$: magnetic susceptibility of vacuum, $\omega$: frequency of light, and $P^{2\omega}$: power of optical second harmonic.

The recording medium subjected to the recording method of the present invention and thus having a record, preferably an imagewise record (hereinafter referred to as "record sheet") may suitably be used for preparation of a printing original form in the following manner.

Thus, the record sheet comprising a recording layer having a nonlinear optical image therein is caused to contact a photosensitive material which may comprise a sheet substrate and a layer of a photosensitive composition formed thereon. The photosensitive sheet in contact with the second sheet is irradiated with laser light and the thus exposed photosensitive sheet, more particularly the layer of the photosensitive composition, is developed to provide a printing original form.

In a preferred embodiment, the recording layer comprises a nonlinear optical material in the form of a solid solution of a para-di-substituted benzene derivative represented by the above formula (2) in a polyoxyethylene matrix. When the nonlinear optical material is heated to temperature of the melting point or thereabove and is supplied with a DC electric field in this state, the para-di-substituted benzene derivative is oriented or aligned in the mixture to show a nonlinear optical effect and retains its state when it is cooled below the melting point as it is. Further, if the nonlinear optical material is heated above the melting temperature without application of a DC electric field, it is caused to show substantially no electric field any longer. By using such a property, a process for preparing a printing original form is provided.

More specifically, the nonlinear optical material is applied on a support such as an aramide film, and is heated above the melting point and cooled under the application of a DC electric field, whereby a nonlinear optical film showing a nonlinear optical effect is prepared. Then, the nonlinear optical film is selectively or locally heated by means of a thermal head, etc., corresponding to given image data, whereby only the heated portion depending on the given image data loses the nonlinear optical effect.

The thus formed nonlinear optical film having a portion showing a nonlinear optical effect and a portion not showing a nonlinear optical effect is caused to contact a photosensitive film, such as a dry film or a film coated with a photosensitive composition, and they were inclusively exposed to laser light having an emitted wavelength of 800-1000 nm. As a result, a photosensitive film having a sensitivity in the range of 400-500 nm equal to the wavelength of the second harmonic of the emitted laser light is photoreacted at a part contacting the portion of the nonlinear optical film showing a nonlinear optical effect, whereby image transfer is effected. Then, the exposed photosensitive film is developed by peeling off an overcoat film in the case of a dry film or by dipping in a developer liquid in the case of a photosensitive resin for relief printing, whereby a printing original form is prepared.

Figure 5:
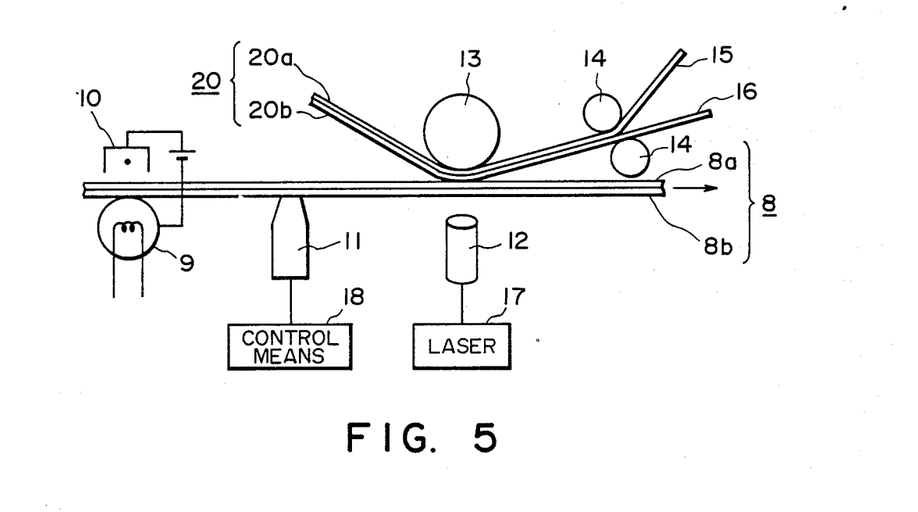
FIG. 5 is a schematic view illustrating a system for preparing a printing original plate according to the present invention.

FIG. 5 is a schematic view for illustrating an embodiment of the preparation of a printing original form as described above. Referring to FIG. 5, a nonlinear optical film 8a disposed on a support 8b is sent in the right direction and first heated by a heating roller under the application of an electric field given by a corona charger 10, whereby a para-disubstituted benzene derivative in the nonlinear optical film 8a is aligned so that the nonlinear optical film 8a is provided with a nonlinear optical effect. Then, the nonlinear optical film 8a is selectively heated imagewise by a heating means 11 such as a thermal head controlled by controlling means 12 for imagewise heating and setting a heating temperature, whereby the nonlinear optical film 8a is caused to lose its non-linear optical effect selectively. Then, the non-linear optical film 8a provided with a pattern of non-linear optical effect is caused to contact a photosensitive film 20a comprising a photosensitive layer 20a and a support or overcoat layer 20b under the action of a pressing roller 13, and the superposed structure is uniformly exposed to laser light emitted from laser 17 and controlled by exposure means 12, whereby the photosensitive layer is photoreacted imagewise through the imagewise nonlinear optical effect of the nonlinear optical film 8. Then, the overcoat layer 16 (20b) is peeled off by the action of peeling rollers 14 to leave a printing original form 15.

The nonlinear optical film is reversibly provided with and caused to lose a nonlinear optical effect, so that the nonlinear optical film can be used by rewinding it after the exposure of the photosensitive film. Thus, a remarkable economization of production cost can be expected.

Hereinbelow, the present invention will be explained in more detail based on Examples.

Example 1

1.03 g (23 mmol) of polyoxyethylene having a molecular weight of $2 \times 10^4$ and 0.44 g (3 mmol) of paramolecular nitroaniline were added to 10 ml of benzene, and the mixture was heated for 5 hours for dissolution. The solution was applied onto a glass substrate to form a 10 $\mu$m-thick recording layer.

The thus-prepared recording medium was irradiated with InP-semiconductor laser light ($\lambda$(wavelength) = 1.3 $\mu$m) under the application of a DC electric field of 1000 V/cm in a horizontal direction, thereby to effect writing.

Then, the written part of the recording layer was illuminated with Nd-YAG laser light ($\lambda = 1.064$ $\mu$m), whereby the generation of an optical second harmonic ($\lambda = 0.532$ $\mu$m) was observed by a photomultiplier.

On the other hand, no SHG (second harmonic generation) was observed from the non-written parts by similar illumination.

Example 2

1.0 g of polyethylene glycol distearate ($RCOO(CH_2CH_2)_nCOOR$, $R=C_{17}H_{35}$, average molecular weight (Mw): about 1500, "Emanon 3299" available from Kao K. K.), 0.3 g of polyethylene oxide (Mw=5×10⁶) and 0.2 g of p-nitroaniline were added to 30 ml of benzene, and an infrared absorber (IR-750, available from Nippon Kayaku K. K.) was added thereto, followed by 1 hour of heating for dissolution.

The solution was applied by spin coating on a glass substrate coated with a transparent electrode of NESA film to form a 20 μm-thick uniform recording layer. Onto the recording layer, a glass substrate coated with a NESA transparent electrode was applied to form an intimate contact, and the recording layer was heated to 80° C and gradually cooled to room temperature under application of a DC electric field of 100 V. Then, the recording layer was irradiated with semiconductor laser light ($\lambda$=780 nm, 30 mW) through a collimator lens and a condenser lens, thereby to effect recording.

As a result of illumination with Nd-YAG laser light ($\lambda$=1.064 μm), no SHG was observed from the thus recorded portion while the generation of an SHG ($\lambda$=0.532 nm) was observed at the non-recorded portion through a photomultiplier.

Then, the recording medium was heated to 80° C. and cooled to room temperature under the application of a DC voltage of 100 V. Then, the recording layer was illuminated with Nd-YAG laser light ($\lambda$=1.064 μm), whereby optical SHG was observed from the whole area thereof so that the above recorded portion was erased.

Example 3

1.0 g of polyoxyethylene (Mw=10⁶), 0.2 g of a polyethylene glycol derivative (Mw=about 400; "DA-350F" available from Nihon Yushi K. K.) represented by the formula:

and 0.2 g of p-nitroaniline were dissolved in 20 ml of benzene and 10 mg of IR 750 (available from Nihon Kayaku K. K.) was added thereto, followed by 1 hour of heating for dissolution.

The solution was applied by spin coating on a glass substrate coated with a transparent electrode of NESA film to form a 10 μm-thick uniform recording layer. Onto the recording layer, a glass substrate coated with a NESA transparent electrode was applied to intimately contact the recording layer. A part of the recording layer was irradiated with semiconductor laser light ($\lambda$=780 nm) initially at a power of 30 mW for heating and then at a gradually decreasing power for cooling to room temperature under the application of a DC voltage of 50 V, whereby recording was effected.

The thus recorded part of the recording layer was illuminated with Nd-YAG laser light ($\lambda$=1.064 μm) whereby an SHG ($\lambda$=532 nm) was observed by a photomultiplier.

Then, another part of the recording layer was selected and irradiated with semiconductor laser light initially at a power of 30 mW for heating and then at a gradually decreasing power for cooling to room temperature under the application of a DC voltage of 10 V. The thus-recorded part of the recording layer was again illuminated with Nd-YAG laser light ($\lambda$=1.064 μm), whereby an optica second harmonic was detected at an intensity which was about 20% of that obtained in the above-mentioned case of application of 100 V.

Example 4

2.12 g of polyoxyethylene (Mw=5×10⁶) and 1.57 g of para-nitroaniline were added to 100 ml of acetonitrile, followed by 5 hours of heating for dissolution. The solution was applied onto a 6 μm-thick aramide film placed on a hot plate heated at 60°-80° C. by means of an applicator and dried to form a coated film having a 50 μm thick recording layer.

An aluminum foil was intimately applied on both sides of the coated film. The resultant laminate was heated on a hot plate to 80° C. and then gradually cooled to room temperature while continually applying a DC electric field of 1000V. Then, the aluminum foil was peeled off, and the resultant laminate was heated imagewise to 120° C. by means of a thermal head from the aramide film side to form a record sheet.

Separately, polyvinylcinnamylidene acetate and 7 wt. % thereof of erythrosine were dissolved in ethyl acetate to form a photosensitive solution, which was then applied by an applicator on a 100 μm-thick aluminum sheet to prepare a photosensitive sheet having a 10 μm-thick photosensitive layer.

The photosensitive sheet was caused to intimately contact the record sheet prepared above and illuminated through the record sheet with Nd-YAG laser light ($\lambda$=1.064 μm). Then, the photosensitive sheet was dipped in aqueous ethyl acetate solution, whereby a good original form for letterpress printing.

Example 5

A printing form was prepared by using a system as shown in FIG. 5.

The coated film 8 prepared in Example 4 was moved along a heat roller 9 at 100° C. and a corona charge was provided on the side of the recording layer 8a by means of a corona charger 10 supplied with a voltage of 1.7 kV.

Then, a thermal head 11 was controlled by given image signals to heat the recording layer 8a imagewise through the aramide support film 8b. Then, the coated film thus treated (record sheet) was superposed with Curomalin Film (available from E. I. Du Pont) 20 so that its recording layer 8a contacted the overcoat layer 20b of the Curomalin Film. Then, the superposed structure was illuminated with respect to the whole area from the second sheet side 8 by semiconductor laser light ($\lambda$=833 nm) according to a luster scanning mode. Then, the Curomalin Film 20 was separated from the record sheet and the overcoat layer 20b was peeled therefrom, whereby a good original form for letterpress printing 15 was prepared.

As described above, according to the present invention, a recording medium composed of an organic material is used, so that the production cost thereof is lower than the conventional system, such as photomagnetic recording system. Particularly, the above-described solid solution of a para-di-substituted benzene derivative in polyoxyalkylene has a good solubility in a solvent, so that it is readily formed as by spin coating into a thin film having a sufficient mechanical strength. Thus, the recording medium is suited for mass production.

Further, as compared from a conventional system wherein a quantitative change such as reflected light intensity or rotation angle of polarized plane is utilized for readout, a qualitative change, i.e., the presence or absence of second harmonic generation, is detected for readout of record, so that an improved sensitivity can be attained. Further, as compared with a conventional optical disk using an organic material, the system of the present invention is advantageous in that it allows reutilization through erasure.

As described above, according to the recording method and recording medium of the present invention, the presence or absence of a non-linear effect can be effectively utilized for data recording and display. Further, by utilizing the above recording method, it is possible to prepare a clear printing original form in a convenient and inexpensive manner.

What is claimed is:

1. A recording method, comprising the steps of:
   providing a recording medium including a substrate and a recording layer formed thereon, said recording layer comprising a solid solution of a guest compound in a polymer, said guest compound having a second order molecular nonlinear optical susceptibility $\beta$ of at least five$\times 10^{-30}$ e.s.u. but substantially no nonlinear optical effect in its crystal form; and writing a record in the recording layer by heating and cooling at least a part of the recording layer and applying an external field to at least a part of the recording layer so that at least a part of the recording layer is cooled to solidify under the application of the external field to form a portion showing a nonlinear optical effect and a part of the recording layer cooled to solidify in the absence of the external field to form a portion showing substantially no nonlinear optical effect, said record in said recording layer being written by the combination of said part showing a nonlinear optical effect and said part showing substantially no nonlinear optical effect.

2. A method according to claim 1, wherein said part of the recording layer solidified in the absence of an external field has a function of scattering laser light.

3. A method according to claim 1, wherein said guest compound is a para-di-substituted benzene derivative.

4. A method according to claim 1, wherein said polymer comprises a polyoxyalkylene unit.

5. A method according to claim 1, wherein said external field is an electric field.

6. A method according to claim 1, wherein said external field is a magnetic field.

7. A method according to claim 1, wherein said nonlinear optical effect is second harmonic generation.

8. A recording method, comprising the steps of:
   providing a recording medium including a substrate and a recording layer formed thereon said recording layer comprising a solid solution of a guest compound in a polymer, said guest compound having a second order molecular nonlinear optical susceptibility $\beta$ of at least $5 \times 10^{-30}$ e.s.u. but showing substantially no nonlinear optical effect in its crystal form; and
   writing a record in the recording layer by heating and solidifying at least a part of the recording layer under the application of an external field thereby to provide said at least a part of the recording layer with a nonlinear optical effect, and then heating and solidifying a prescribed part in said at least a part of the recording layer in the absence of an external field to cause said prescribed part to lose its nonlinear optical effect, said record in the recording layer being formed by the combination of said part showing a nonlinear optical effect and said part showing substantially no nonlinear optical effect.

9. A method according to claim 8, wherein said part of the recording layer solidified in the absence of an external field has a function of scattering laser light.

10. A method according to claim 8, wherein said guest compound is a para-di-substituted benzene derivative.

11. A method according to claim 8, wherein said polymer comprises a polyoxyalkylene unit.

12. A method according to claim 8, wherein said external field is an electric field.

13. A method according to claim 8, wherein said external field is a magnetic field.

14. A method according to claim 8, wherein said nonlinear optical effect is second harmonic generation.

15. A recording method, comprising the steps of:
   providing a recording medium including a substrate and a recording layer recording layer formed thereon, said recording layer comprising a solid solution of a guest compound in a polymer, said guest compound having a second order molecular nonlinear optical susceptibility $\beta$ of at least $5 \times 10^{-30}$ e.s.u. but showing substantially no nonlinear optical effect in its crystal form; and
   writing a record in the recording layer by applying an external field to substantially the whole part of the recording layer while selectively heating and then solidifying a prescribed part of the recording layer to provide said prescribed part with a nonlinear optical effect, said record in said recording layer being formed by the combination of said part showing a nonlinear optical effect and said part showing substantially no nonlinear optical effect.

16. A method according to claim 15, wherein said part of the recording layer solidified in the absence of an external field has a function of scattering laser light.

17. A method according to claim 15, wherein said guest compound is a para-di-substituted benzene derivative.

18. A method according to claim 15, wherein said polymer comprises a polyoxyalkylene unit.

19. A method according to claim 15, wherein said external field is an electric field.

20. A method according to claim 15, wherein said external field is a magnetic field.

21. A method according to claim 15, wherein said nonlinear optical effect is second harmonic generation.

22. A recording apparatus, comprising:
   a recording medium including a substrate and a recording layer formed thereon said recording layer comprising a solid solution of a guest compound in a polymer, said guest compound having a second order molecular nonlinear optical susceptibility $\beta$ of at least $5 \times 10^{-30}$ e.s.u. but showing substantially no nonlinear optical effect in its crystal form;
   external field application means;
   heating means, wherein at least one of said external field application means and said heating means is arranged so as to exert its function to a selected part of the recording layer;
   semiconductor laser illumination means for illuminating said recording layer; and means for detecting an optical second harmonic generated from the recording layer in response to said semiconductor laser illumination.

23. An apparatus according to claim 22, wherein said heating means is a heat-generating head.

24. An apparatus according to claim 22, wherein said heating means is a laser.

25. An apparatus according to claim 22, wherein said external field application means is electric field application means.

26. An apparatus according to claim 22, wherein said external field application means is magnetic field application means.

27. A process for recording comprising the steps of:
(a) providing a recording sheet comprising a substrate having a recording layer formed thereon, which recording layer comprises a solid solution of a guest compound in a polymer, said guest compound having a second order molecular nonlinear optical susceptibility $\beta$ of at least $5 \times 10^{-30}$ e.s.u. but showing substantially no nonlinear optical effect in its crystalline form;
(b) writing a record in the recording layer by heating and cooling at least a part of the recording layer and applying an external field to at least a part of the recording layer so that at least a part of the recording layer is cooled to solidify under the application of the external field so as to form a portion showing said nonlinear optical effect and a part of the recording layer cooled so as to solidify free of said external field to form a portion showing substantially no nonlinear optical effect, said record in said recording layer being formed by the combination of said part showing a nonlinear optical effect and said part showing substantially no nonlinear optical effect;
(c) contacting the recording sheet with a photosensitive material and exposing the photosensitive sheet in contact with the recording sheet to laser light; and
(d) developing the exposed photosensitive material.

28. A process according to claim 27, wherein said step (b) is divided into sub-steps of: heating and cooling the recording layer under the application of the external field, and heating and cooling a part of the recording layer in the absence of an external field.

29. A process according to claim 27, wherein said polymer comprises a polyoxyalkylene having oxyalkylene units represented by the formula:

wherein R denotes an alkylene group having 1–6 carbon atoms, and n is the total number of the oxyalkylene units ranging from 100 to 200,000.

30. A process according to claim 27, wherein said guest compound is a para-di-substituted benzene derivative represented by the formula:

wherein D and E are an electron donative group and an electron attractive group, respectively.

31. A process according to claim 29, wherein D denotes an electron donative group selected from amino, alkyl, alkoxy, alkylamino, hydroxyalkylamino, dialkylamino, hydroxyalkyl-alkylamino, dihydroxyalkylamino and mercapto; and E denotes an electron attractive group selected from nitro, cyano, halogen, trifluoromethyl and carbonyl.

* * * * *

UNITED STATES PATENT AND TRADEMARK OFFICE
CERTIFICATE OF CORRECTION

PATENT NO. : 4,946,261

DATED : August 7, 1990

INVENTOR(S) : HISAO YAEGASHI ET AL.

It is certified that error appears in the above-identified patent and that said Letters Patent is hereby corrected as shown below:

On the title page:

AT [56] REFERENCES CITED

Other Publications, "Twics" should read --Twieg et al.,-- and "Meredith et al.," should read --Meredith--.

COLUMN 3

Line 32, "sheet" should read --sheets--.
Line 66, "solic" should read --solid--.

COLUMN 4

Line 7, "represents" should read --represented--.
Line 51, "structure. 2.A" should read --structure. ¶ 2. A--.
Line 55, "$(R_3\!-\!O)_{n3}$. 3. A" should read --$(R_3\!-\!O)_{n3}$. ¶ 3. A--.

COLUMN 6

Line 63, "10 to 100,00," should read --10 to 100,000,--.

COLUMN 14

Line 49, "paramolecular nitroaniline" should read --paranitroaniline--.

COLUMN 15

Line 68, "optica" should read --optical--.

UNITED STATES PATENT AND TRADEMARK OFFICE
CERTIFICATE OF CORRECTION

PATENT NO. : 4,946,261

DATED : August 7, 1990

INVENTOR(S) : HISAO YAEGASHI ET AL.

It is certified that error appears in the above-identified patent and that said Letters Patent is hereby corrected as shown below:

COLUMN 17

Line 23, "fiveX10$^{-30}$" should read --5X10$^{-30}$--.

COLUMN 18

Line 22, "recording layer recording layer" should read --recording layer--.

COLUMN 20

Line 12, "$\text{-(-T---O-)}_n$ (1)," should read --$\text{-(-R---O-)}_n$ (1),--.

Signed and Sealed this

Fourteenth Day of January, 1992

Attest:

HARRY F. MANBECK, JR.

*Attesting Officer*   *Commissioner of Patents and Trademarks*